US008885192B2

(12) United States Patent
Rowson et al.

(10) Patent No.: US 8,885,192 B2
(45) Date of Patent: Nov. 11, 2014

(54) DATA TRANSFORMATION USING LEAF AND NON-LEAF NODES (75) Inventors: James Allely Rowson, Fremont, CA (US); Adam Milligan, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 647 days.

(21) Appl. No.: 13/080,578

(22) Filed: Apr. 5, 2011

(65) Prior Publication Data

US 2012/0257255 A1    Oct. 11, 2012

(51) Int. Cl.
*G06F 3/12* (2006.01)
*G06F 17/30* (2006.01)

(52) U.S. Cl.
CPC ............... *G06F 17/30625* (2013.01)
USPC .......................................... 358/1.15

(58) Field of Classification Search
USPC .......................................... 358/1.15
See application file for complete search history.

(56) References Cited

U.S. PATENT DOCUMENTS

| 7,447,748 | B2 | 11/2008 | Reynolds et al. | |
| 8,320,008 | B2 * | 11/2012 | Jahn ............................... | 358/1.15 |
| 2002/0138520 | A1 | 9/2002 | Wakai et al. | |
| 2005/0043848 | A1 * | 2/2005 | Wiechers ....................... | 700/115 |
| 2007/0002351 | A1 * | 1/2007 | Yoshimura et al. ........... | 358/1.13 |
| 2007/0055675 | A1 * | 3/2007 | Oosawa ......................... | 707/10 |
| 2009/0015860 | A1 * | 1/2009 | Jahn et al. ..................... | 358/1.15 |
| 2009/0198571 | A1 * | 8/2009 | Hanechak et al. ............. | 705/10 |
| 2010/0004944 | A1 | 1/2010 | Palaniappan | |
| 2010/0302585 | A1 * | 12/2010 | Saito ............................. | 358/1.15 |
| 2010/0328703 | A1 * | 12/2010 | Cain .............................. | 358/1.15 |
| 2012/0154866 | A1 * | 6/2012 | Chatow et al. ................ | 358/1.15 |

FOREIGN PATENT DOCUMENTS

KR         20050030942 A         3/2005

OTHER PUBLICATIONS

J. Crupi et al., "Enterprise Mashups Part I: Bringing SOA to the People," SOA Magazine Issue XVIII, May 2008.
A. Viswanathan, "Mashups and the enterprise mashup markup language (EMML)," Dr. Dobbs Journal, Apr. 12, 2010.
http://en.wikipedia.org/wiki/Leaf_node#Terminology.
http://www.princeton.edu/~achaney/tmve/wiki100k/docs/Leaf_node.html.
http://www.techterms.com/definition/leaf.
http://www.webopedia.com/sgsearch/results?cx=partner-pub-8768004398756183%3A676.
http://www-01.ibm.com/software/globalization/terminology/l.html.

* cited by examiner

Primary Examiner — Eric A Rust (57) ABSTRACT

A hierarchical tree is received that includes nodes. The nodes include a leaf node and a non-leaf node. The leaf node points to the non-leaf node, and specifies original data. The non-leaf node specifies a script to transform the original data to generate transformed data. The script is executed to transform the original data to generate the transformed data. The transformed data is output.

20 Claims, 4 Drawing Sheets

DATA TRANSFORMATION USING LEAF AND NON-LEAF NODES

BACKGROUND

With the increasing popularity of the Internet, there is a large amount of content available to users. Different Internet web sites permit a user to avail him or herself of different types of content. Such content runs the gamut from images to text, to even whole books, among other types of content.

DETAILED DESCRIPTION

As noted in the background section, users can avail themselves to a wide variety of different content on the Internet. However, combining disparate content, from same or different Internet web sites, and/or being able to generate a printed form of this content, can be difficult even for more seasoned users of the Internet. For instance, a user may wish to generate in booklet form content from a number of different sources, such that the combined content can be printed in an aesthetically pleasing manner for offline viewing.

Disclosed herein are approaches that permit such combined content to be generated. A hierarchical tree having a number of nodes is received. The nodes can include leaf nodes and non-leaf nodes. Each leaf node points to a non-leaf node, and each non-leaf node, except for one or more topmost non-leaf nodes, points to another non-leaf node. Each leaf node specifies original content, whereas each non-leaf node specifies a script to transform the data input to this node to generate transformed data.

The hierarchical tree is navigated in a bottom-up manner. For each non-leaf node of the hierarchical tree, the script of the non-leaf node is executed to generate corresponding transformed data. In this manner, data that includes content can be received and transformed in the process of navigating the hierarchical tree, so that the ultimate result is combined content that may be able to be printed in an aesthetically pleasing manner.

Techniques disclosed herein further provide entities such as content providers a mechanism by which end users of these entities can combine content provided by the entities in user-desired ways. Application programming interfaces (APIs) are exposed that permit such content providers to generate hierarchical trees corresponding to end-result combined content. The actual content that is combined, and potentially how this content is combined, may be specified by an end user through a web site operated by or for the content provider. Other APIs are then called by the entity in question to generate the end-result combined content.

Disclosed herein as well are techniques that permit such end-result combined content to be printed by a print service provider for the end user of the content provider, without this entity having to operate or be the print service provider. An API may be callable by the entity to issue a fulfillment request, by which an order placed by the end user for one or more printed copies of the combined content is sent to a print service provider. The print service provider can then print the combined content, and ship the desired number of copies of this content to the end user.

Figure 1:
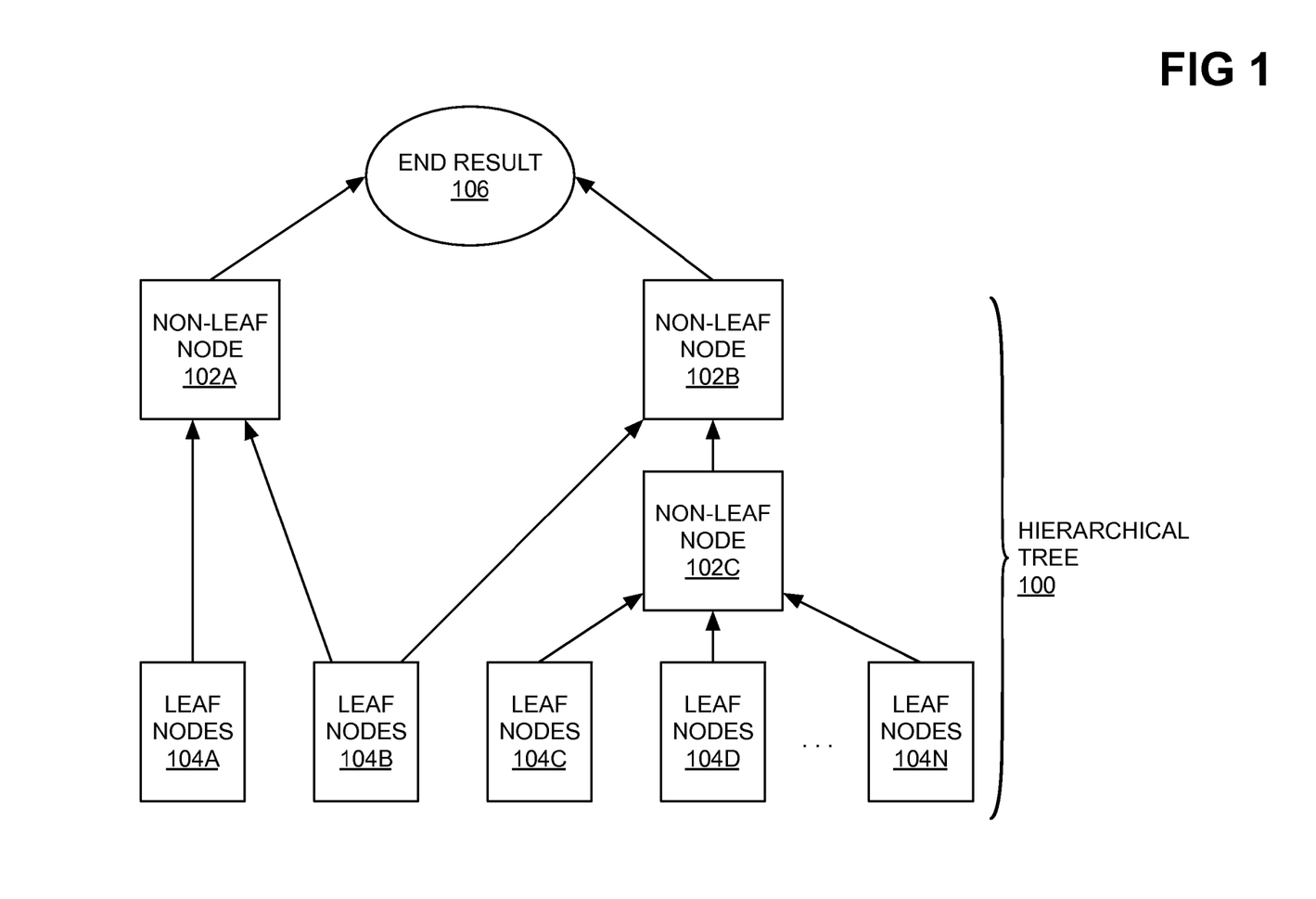
FIG. 1 is a diagram of an example representative hierarchical tree.

FIG. 1 shows an example representative hierarchical tree 100. The hierarchical tree 100 includes non-leaf nodes 102A, 102B, and 102C, which are collectively referred to as the non-leaf nodes 102. The hierarchical tree 100 also includes leaf nodes 104A, 104B, 104C, 104D, . . . , 104N, which are collectively referred to as the leaf nodes 104.

The non-leaf nodes 102 are each defined as a node of the hierarchical tree 100 to which one or more other nodes, be they non-leaf nodes 102 or leaf nodes 104, point. The leaf nodes are each defined as a node of the hierarchical tree 100 to which no other node points. As such, the leaf nodes 104A and 104B point to the non-leaf node 102A; the leaf node 104B and the non-leaf node 102C point to the non-leaf node 102B; and, the leaf nodes 104C, 104D, . . . , 104N point to the non-leaf node 102C.

The hierarchical tree 100 is hierarchical in that the nodes are organized in a hierarchy. The leaf nodes 104 occupy the bottom of the hierarchy, and the non-leaf nodes 102A and 102B occupy the top of the hierarchy. The non-leaf node 102C occupies the middle of the hierarchy, between the leaf nodes 104 and the non-leaf nodes 102A and 102B.

Each leaf node 104 specifies original data, such as original content, including images, portable document format (PDF)-formatted files, text, and so on. The data or content is original in that the data or content has not been transformed or otherwise processed within the hierarchical tree 100. The original data may be specified within a leaf node 104 by a universal resource identifier (URI), such as a universal resource locator (URL) address. In this example, the original data is not part of the leaf node 104, but rather is referenced by the leaf node 104. However, the original data may be specified by being contained in a leaf node 104 itself.

Each non-leaf node 102 specifies a script that transforms data input to the non-leaf 104 into transformed data. Execution of the script of a leaf node 104 thus generates the transformed data from the input data. For instance, the script may specify that the data is to be cropped, resized, transformed from color into black and white, and so on. Where a non-leaf node 102 has data from more than one other node 102 and/or 104 input thereto, the script may specify how the data from each such node 102 and/or 104 is to be assembled in generating the transformed data.

The reference of each non-leaf node 102 to one or more other nodes 102 and/or 104 may be specified in one of two ways. First, each such other node 102 and/or 104 may be explicitly specified internal to the script of the non-leaf node 102 in question. For example, the script of the non-leaf node 102B may have "hard coded" (i.e., explicitly specified) that the nodes that point to the node 102B include the leaf node 104B and the non-leaf node 102C.

Second, each such other node 102 and/or 104 may be specified within a markup language file, such as an extensible markup language (XML) file external to the script of the non-leaf node 102 in question. For instance, rather than having the script of the non-leaf node 102C explicitly specify the leaf nodes 104C, 104D, . . . , 104N, a markup language file may specify these leaf nodes. As one example, the leaf nodes 104C, 104D, . . . , 104N may have a particular naming convention in which the name of each of these leaf nodes 104 begins with the prefix "page." As such, the XML file may specify the leaf nodes 104C, 104D, . . . , 104N as any leaf node 104 beginning with this prefix.

Processing of the nodes 102 and 104 of the hierarchical tree 100 results in an end result 106, which is data, such as content, of the leaf nodes 104 as transformed by the non-leaf nodes 102. The nodes 102 and 104 are processed by navigating the hierarchical tree 100 in a bottom-up manner, and executing the script of each non-leaf node 102C encountered. Once the scripts of the top-most nodes 102A and 102B have been executed, processing of the hierarchical tree 100 is finished.

In the example of FIG. 1, the script of the non-leaf node 102C is thus executed first to transform the data of each leaf node 104C, 104D, . . . , 104N. The script of the non-leaf node 102A may be executed at the same or different time to transform the data of the leaf nodes 104A and 104B. After the script of the non-leaf node 102C is executed, the script of the non-leaf node 102B is executed to transform the data of the leaf node 104B and of the non-leaf node 102C. The end result 106 in this example includes the data output by the non-leaf node 102A and by the non-leaf node 102B.

As a more concrete example, the hierarchical tree 100 may correspond to a book. The leaf node 104A may correspond to a brief introduction of the book, and the leaf node 104B may correspond to an image for the book. The leaf nodes 104C, 104D, . . . , 104N may correspond to the pages of the book. The non-leaf node 102C generates the chapters of the book from the pages output by the leaf nodes 104C, 104D, . . . , 104N. The non-leaf node 102A generates the cover of the book from the text output by the leaf node 104A and from the image output by the leaf node 104B. The non-leaf node 102B generates the inside content of the book (i.e., the book apart from the cover) from the chapters output by the non-leaf node 102C and from the image 104B, which may be added to the first page of each chapter, for instance.

In this example, then, there are two top-most nodes 102A and 102B within the hierarchical tree 100 that do not point to any other node. The top-most node 102A corresponds to and specifies the cover of the book to which the hierarchical tree 100 corresponds. The top-most node 102B corresponds to and specifies the internal pages of this book, organized by chapter.

The example hierarchical tree 100 thus shows how different types of combined content, and other types of transformed data, can be generated using such a tree 100. For content to be used by a project like a book, a hierarchical tree 100 is specified that includes leaf nodes 104 corresponding to this content. Furthermore, the hierarchical tree 100 is specified to include non-leaf nodes 102 that transform this content in a desired manner. As noted above, the nodes 102 and/or 104 that point to a given non-leaf node 102 can be specified internally within the script of this given node 102, or by a markup language file.

In its simplest form, a hierarchical tree 100 includes at least one non-leaf node 102 and at least one leaf node 104. The leaf node 104 in such a simple hierarchical tree 100 is the content that is input to the hierarchical tree 100. The non-leaf node 102 encompasses the transformation of this content to generate transformed content. However, a hierarchical tree 100 can also be significantly more complex than that depicted in FIG. 1, with hundreds if not more of leaf nodes 104 and of non-leaf nodes 102, organized in a complicated hierarchy having a large number of hierarchical levels.

Figure 2:
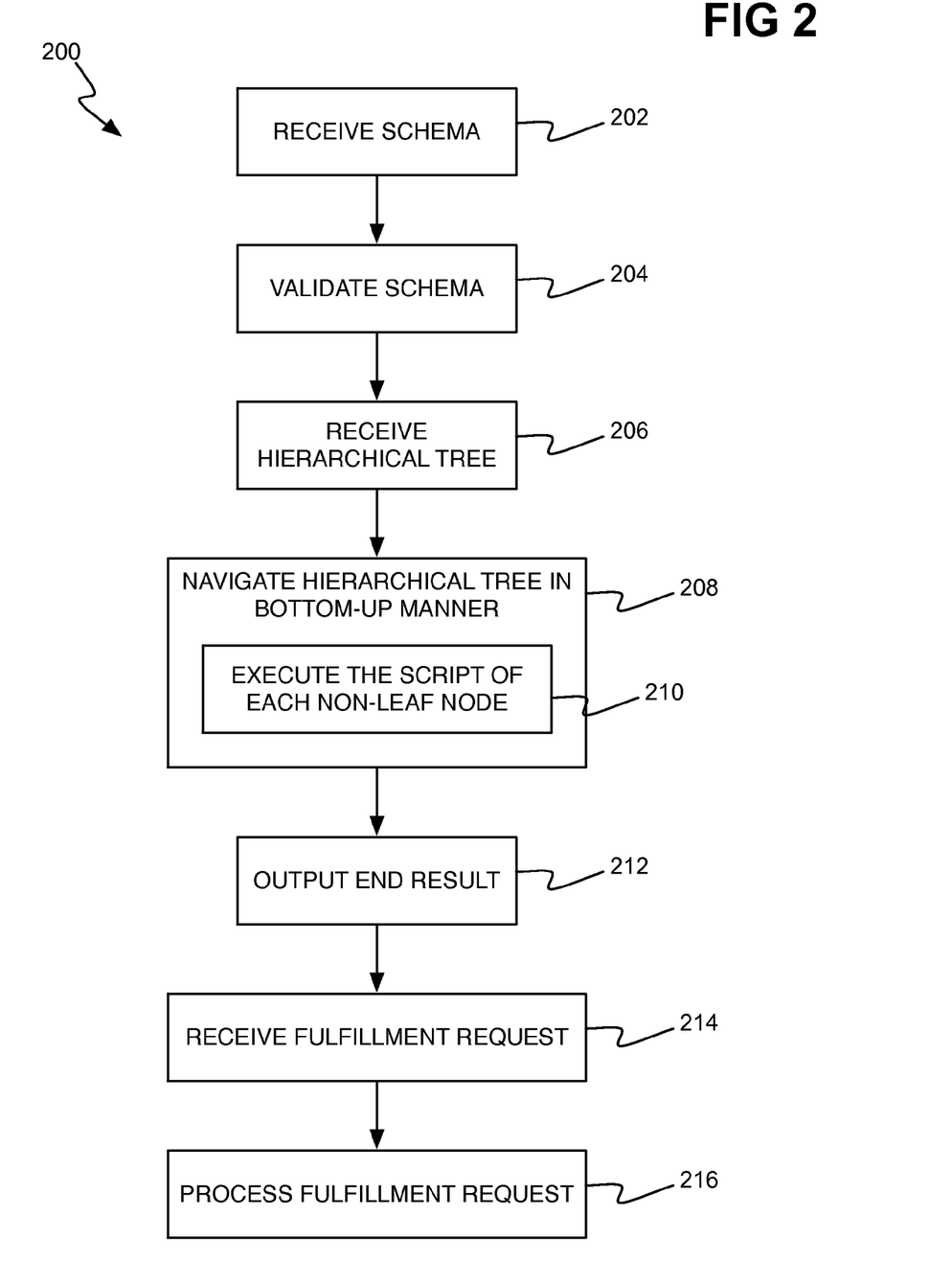
FIG. 2 is a flowchart of a first example method to transform data.

FIG. 2 shows an example method 200. The method 200 may be performed by a processor of a computing device. A non-transitory computer-readable data storage medium may store a computer program. As such, execution of the computer program by the processor causes the method 200 to be performed.

A schema can be received (202). The schema specifies a hierarchical structure of a hierarchical tree. For instance, the schema may specify how the nodes of the hierarchical tree are organized in relation to one another, the type of data output by each node, and the type of data to be input to each non-leaf node. The schema does not include the hierarchical tree itself, but rather specifies the hierarchical tree in a outward-looking, "black box"-type of manner. For instance, the actual original data of each leaf node is not specified by the schema, nor the actual script of each non-leaf node. Rather, the type of the original data of each leaf node is specified by the schema, as well as the type of data input and output by each non-leaf node.

The schema can be validated to ensure that the project, such as a book, that is the end result of the hierarchical tree is able to be generated (204). More generally, the schema is validated to verify that the execution of the scripts of the non-leaf nodes are able to be completed without error, based on the type of input data and the type of output data of each non-leaf node. For example, if a non-leaf node is to receive an image in a joint photographic experts group (JPG or JPEG)-formatted file, but the leaf node that points to this non-leaf node outputs a PDF-formatted file, then validation of the scheme will fail, due to file format incompatibility.

Assuming that schema validation is successful, the hierarchical tree itself is received (206), including specification of each node within the tree. The hierarchical tree is navigated in a bottom-up manner (208), as has been described by reference to the example of FIG. 1. At each non-leaf node that is navigated to, the script of the non-leaf node is executed (210) to transform the data input to the non-leaf node to generate the transformed data that is output by this non-leaf node. Execution of the scripts of the non-leaf nodes may be performed sequentially, or concurrently inasmuch as possible based on the dependencies among the leaf nodes. For instance, if a first non-leaf node points to a second non-leaf node, then the first non-leaf node has to have its script executed before the script of the second non-leaf node can be executed.

The end result of processing the hierarchical tree is output (212). The end result includes the transformed data generated by each top-most non-leaf node of the hierarchical tree. Output may include, for instance, displaying the end result on a display device for a user, so that the user can preview the project to which the hierarchical tree corresponds.

The method 200 provides for a fulfillment request for the transformed data being received as well (214). The fulfillment request may specify a number of printed copies of the end result that are to be printed, as well as the shipping destination, such as the address of a user, to which the printed copies are to be shipped. The fulfillment request may also specify the print service provider, such as the commercial printer, that is to print the specified number of copies of the transformed data. The fulfillment request is ultimately processed (216). The computing device performing the method 200 may transmit the end result to the specified print service provider, with instructions as to how many copies of the end result to print, and to where to ship these printed copies.

In this respect, the method 200 can be performed by the computing device of an entity, such as a business, providing a content generation service, which may be colloquially referred to as a content "mash up" service, to another entity, such as a provider of content. The method 200 may be implemented without any sort of user interface (UI). Rather, the content provider may code its own UI to expose to end users, such as human individuals, and to create the types of desired projects to offer to its end users. Once an end user has specified the content and how it is to be assembled, within the dictates specified by the content provider, the content provider may then transmit this information to the entity whose computing device performs the method 200.

Furthermore, the entity having the computing device that performs the method 200 may be separate from the print service provider that generates the printed output for the end user of the content provider. As such, there may be a total of at least three entities in one example scenario. The first entity is that which controls the computing device that performs the method 200. The second entity is the content provider that contracts with or otherwise arranges for the first entity to perform the method 200 in relation to content. The third entity is the print service provider that ultimately prints hardcopies of the transformed content, or other data.

Figure 3:
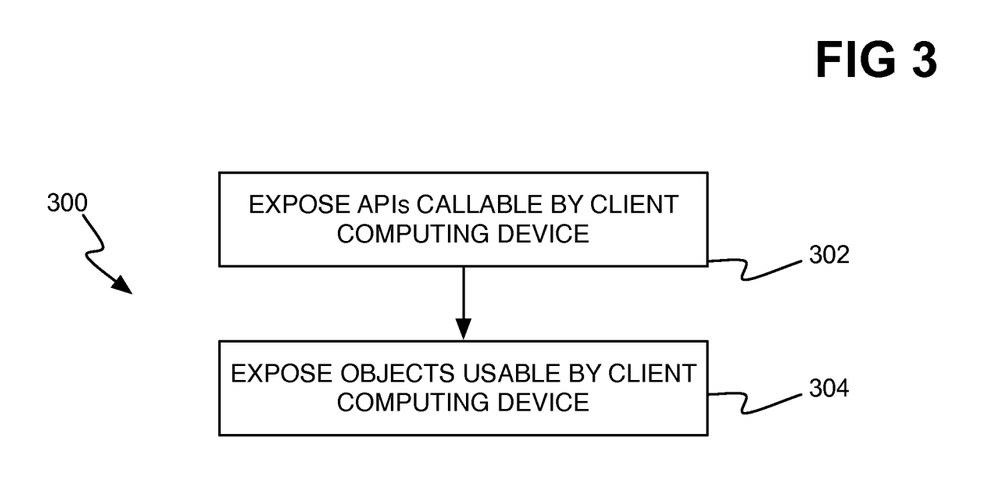
FIG. 3 is a flowchart of a second example method to transform data.

FIG. 3 shows another example method 300. As with the method 200, the method 300 may be performed by a processor of a computing device. A non-transitory computer-readable data storage medium may store a computer program that when executed by the processor causes the method 300 to be performed.

The method 300 exposes a number of APIs (302). The APIs are callable by a client computing device, different than the computing device performing the method 300 (and the method 200), and which is controlled by an entity that may be different than the entity controlling the computing device performing the methods 200 and 300. For instance, the entity controlling the client computing device may be a content service provider, whereas the entity controlling the computing device performing the methods 200 and 300 may be a business that provides a "mash-up" service to such content service providers.

An API is a particular set of rules and specifications that a computer program can follow to access and make use of the services and resources provided by another particular computer program that implements the API. An API serves as an interface between different computer programs and facilitates their interaction, similar to the way the user interface facilitates interaction between humans and computers. The APIs are called by the client computing device to specify hierarchical trees and their constituent nodes, as well as other parameters that govern the execution of the method 200 that has been described.

For instance, the APIs can include a leaf node API, a non-leaf node API, a hierarchical tree API, a print service API, a client API, a generate API, a fulfillment API, and a print API. The leaf node API is called to create a leaf node of a hierarchical tree, whereas the non-leaf node API is called to create a non-leaf node of a hierarchical tree. These APIs receive parameters that specify the nodes in question to be created, such that calling the APIs with such parameters results in corresponding nodes being created. The nodes themselves, however, may not be returned by the APIs, but rather are maintained at the computing device performing the methods 200 and 300, such that just references to the created nodes are returned.

The hierarchical tree API is called to create a hierarchical tree. This API receives parameters that specify the nodes of the hierarchical tree via references to previously created and/or standard or "stock" nodes, as well as how these nodes are structurally arranged in relation to one another. The hierarchical tree may also not be returned by this API, but rather is maintained at the computing device performing the methods 200 and 300, such that just a reference to the hierarchical tree is returned.

The print service API may be called to specify the print service provider that is to print the transformed data that is generated when a hierarchical tree that has been created is navigated and the scripts of its constituent non-leaf nodes are executed. For instance, there may be a number of different types of print service providers. Some print service providers may specialized in certain types of printed content; some print service providers may specialize in low-volume orders whereas other print service providers may specialized in high-volume orders; and so on. Therefore, a content provider may wish for a particular print service provider to be used, and can specify this by calling the print service API.

The client API may be called to specify the entity, such as the content provider, associated with the client computing device that is creating the hierarchical tree and its constituent nodes. Calling the client API therefore performs such an entity to be registered with the entity that controls the computing device that performs the methods 200 and 300. This further enables the entity that controls the computing device that performs the methods 200 and 300 to offer its services to multiple and different other entities, such as various content providers.

The generate API is called to generate the transformed data as specified by a hierarchical tree. For instance, upon the content provider's client computing device calling the generate API, the computing device performing the methods 200 and 300 particularly executes parts 208, 210, and 212 of the method 200. As such, an end result corresponding to the transformed data is generated, and may be returned to the client computing device, either directly or via a reference thereto.

The fulfillment API is called to specify a fulfillment request for the transformed data. For instance, once the content provider's end user has approved the generated transformed data, the end user may wish to order a number of printed copies of this end result, to be shipped to a particular address. As such, the fulfillment API is correspondingly called by the content provider's client computing device. The fulfillment API may return the total cost for printing and shipping the end result in question.

The print API is called to inform the specified print service provider that a fulfillment request is to be processed by the print service provider. It is noted that while the computing device performing the methods 200 and 300 receives the call to the print API, this computing device then informs a computing device of the print service provider itself to begin printing the end result approved by the content provider's end user. With both this API and the fulfillment API, the content provider's client computing device may provide a callback address to be called to provide the information output by the APIs, or the client computing device may have to periodically poll the APIs again to learn whether this information is available.

The method 300 may further expose a number of objects that are usable by the client computing device when calling the APIs (304). The objects are software objects in an object-oriented programming (OOP) sense, and provide for a data format of instantiations of these objects, and preprogrammed methods that can be used in scripts that manipulate the objects. OOP is a programming paradigm that uses objects— i.e., data structures including data fields and methods together with their interactions—to design applications and computer programs. Programming techniques may include OOP features including data abstraction, encapsulation, messaging, modularity, polymorphism, and inheritance, among other types of OOP features.

Among other types of objects that may be exposed are a leaf node object, a non-leaf node object, and a PDF object. A leaf node object specifies the data format of a leaf node, and includes one or more methods that are executable in relation to the leaf node. Similarly, a non-leaf node object specifies the data format of a non-leaf node, and includes one or more methods that are executable in relation to the non-leaf node.

Example such methods in both cases include performing scripts, such as transforming content, adding page numbers, concatenating arbitrary collections of inputs, and so on.

A PDF object specifies the data format of PDF-formatted data that may be input or output by a node. The PDF object may further include methods that can represent standard and/or basic operations that can be used to manipulate such PDF-formatted data. For instance, the PDF object may expose rotate, crop, transform color-to-black-and-white, and other types of methods that perform their corresponding functionality on PDF-formatted data. As such, a content provider or other entity that uses the services of the entity whose computing devices perform the methods 200 and 300 does not have to code or otherwise develop such functionality itself, but rather can utilize this provided functionality in the scripts of its non-leaf node objects.

As an example, the client computing device may call the non-leaf node API to generate (i.e., instantiate) a non-leaf node object in accordance with specified parameters. The input to the non-leaf node object may be PDF-formatted data specified by a PDF object. The script of the non-leaf node object may thus utilizes the methods exposed by the PDF object to perform certain types of processing on this PDF-formatted data. As such, the content provider or other entity that controls the client computing device does not itself have to code or otherwise develop these types of processing within the script itself.

Figure 4:
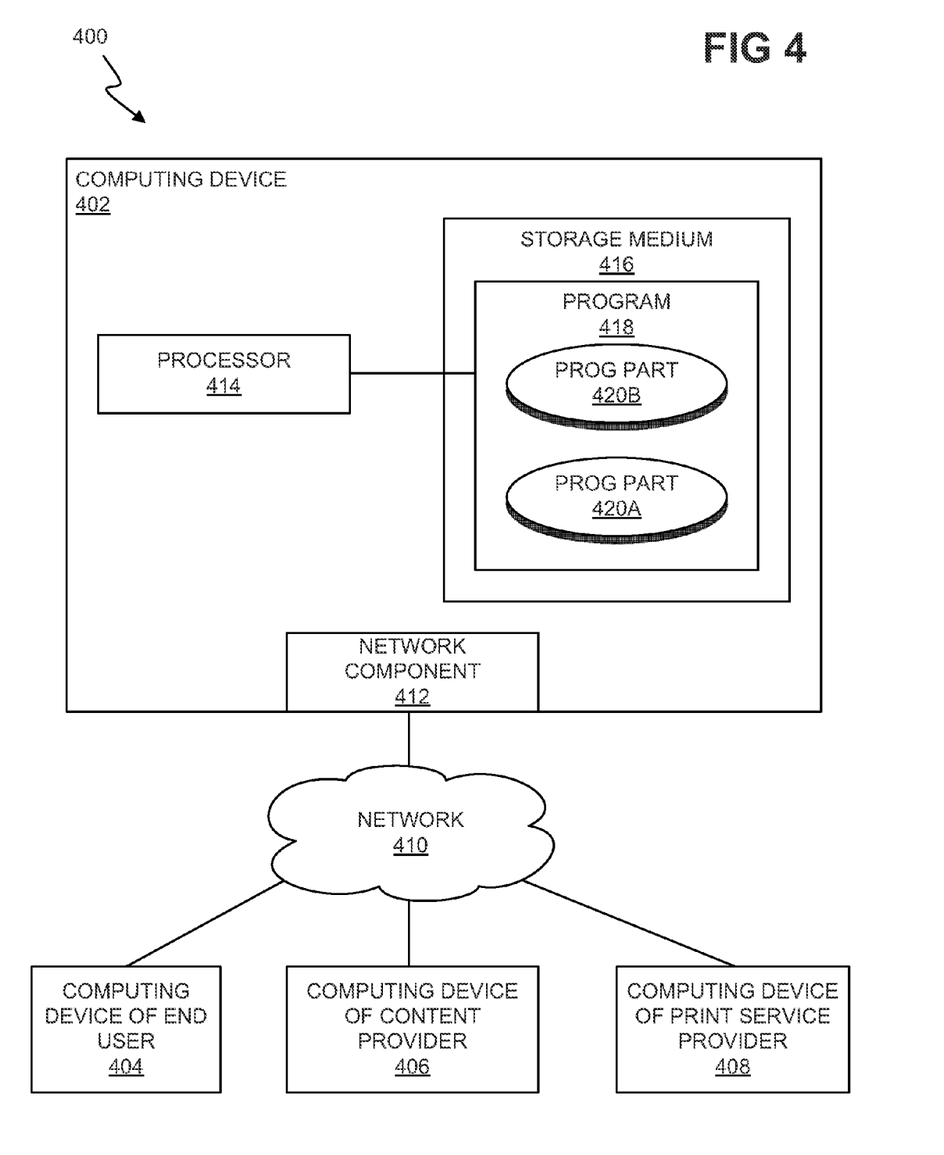
FIG. 4 is a diagram of an example system.

FIG. 4 shows an example system 400. The system 400 includes computing devices 402, 404, 406, and 408, which are communicatively interconnected to one another via a network 410. The network 410 may be or include the Internet, intranets, extranets, wide-area networks (WANs), local-area networks (LANs), wired networks, wireless networks, and/or telephony networks, among other types of networks. As an example, the computing device 402 may be accessible on the Internet at a URL address, such that the computing device 406 is to access the computing device 402 over the network 410 at this URL address.

The computing device 402 is controlled by the entity that provides the "mash up" service described in relation to the methods 200 and 300. The computing device 404 is controlled by an end user, such as an individual person. The computing device 406 is controlled by a content provider or another type of entity. The computing device 408 is controlled by a print service provider.

The computing device 402 is depicted in detail in FIG. 4. The computing device 402 includes at least a hardware network component 412, a processor 414, and a computer-readable data storage medium 416. The hardware network component 412 permits the computing device 402 to communicate with the computing devices 404, 406, and/or 408 over the network 410. The computer-readable data storage medium 416 stores a computer program 416 that is executable by the processor 414.

The computer program 416 includes at least two computer program parts 420A and 420B, which are collectively referred to as the computer program parts 420. The computer program part 420A when executed by the processor 414 performs the method 200 that has been described. Similarly, the computer program part 420B when executed by the processor 414 performs the method 300 that has been described.

In operation of the system 400, the computing device 406 may be utilized by the content provider to employ the APIs exposed by the program part 420B to create a hierarchical data structure, including at least one leaf node and at least one non-leaf node. The computing device 406 may further expose a user interface by which an end user using the computing device 404 specifies desired content and a desired assembly or other transformation of this content. The computing device 406 then calls an API exposed by the program part 420B to generate the end result in accordance with a created hierarchical data structure and the end user's selections, such that the program part 420A performs at least some parts of the method 200.

The computing device 402 returns this end result, or a reference thereto, to the computing device 406, which may provide it to the computing device 404. Once the end user is satisfied with the end result, he or she may use the computing device 404 to initiate an order for one or more printed copies. The computing device 406 receives this request, and calls one or more appropriate APIs exposed by the program part 420B to initiate execution of other parts of the method 200 by the program part 420A. The computing device 406 thus passes this request to the computing device 408 of the print service provider to print the desired copies of the end result, and to ship them to the end user in question.

We claim:
1. A method comprising:
  receiving, by a processor, a hierarchical tree comprising a plurality of nodes, the nodes including a leaf node and a non-leaf node, the leaf node pointing to the non-leaf node, the leaf node specifying original data, the non-leaf node specifying a script to transform the original data to generate transformed data;
  executing, by the processor, the script to transform the original data to generate the transformed data; and,
  outputting, by the processor, the transformed data.
2. The method of claim 1, wherein the nodes comprise a plurality of leaf nodes including the leaf node, and a plurality of non-leaf nodes including the non-leaf node,
  wherein each leaf node points to one of the non-leaf nodes, and each leaf node specifies original data,
  and wherein each non-leaf node except a top-most non-leaf node points to another of the non-leaf nodes, and each non-leaf node specifies a script to transform data input to the leaf node to generate transformed data, where each data input to the non-leaf node is one of the original data of one of the leaf nodes and the transformed data of another of the non-leaf nodes.
3. The method of claim 2, wherein the top-most non-leaf node is a first top-most non-leaf node that specifies a cover of a project to which the hierarchical data structure corresponds, and wherein the nodes comprise a second top-most non-leaf node that specifies internal pages of the project.
4. The method of claim 2, further comprising:
  navigating, by the processor, the hierarchical tree in a bottom-up manner; and,
  for each non-leaf node of the hierarchical tree,
    executing, by the processor, the script of the non-leaf node to transform the data input to the non-leaf node to generate the transformed data.
5. The computing device of claim 2, in which the non-leaf node references the leaf node by one of:
  a markup language file external to the non-leaf node that references a specification of the leaf node;
  the specification of the leaf node internal to the script of the non-leaf node.
6. The method of claim 1, further comprising:
  receiving, by the processor, a schema, the schema specifying a hierarchical structure of the hierarchical tree, including each node of she hierarchical tree; the plurality of leaf nodes comprising a plurality of leaf nodes including a the leaf node and a of non-leaf nodes includ- ing the non-leaf node, the original data specified by each leaf node, and the script for each non-leaf node; and,
validating the schema to verify at least that navigation of the hierarchical tree and execution of the script of each non-leaf node will be able to be completed without error.

7. The method of claim 1, wherein the non-leaf node references the leaf node by one of:
a markup language file external to the non-leaf node that references a specification of the leaf node;
the specification of the leaf node internal to the script of the non-leaf node.

8. The method of claim 1, further comprising:
receiving, by the processor, a fulfillment request for the transformed data, the fulfillment request specifying a number of printed copies of the transformed data at are to be printed, and a shipping destination to which the printed copies of the transformed data are to be shipped; and,
processing, by the processor the fulfillment request.

9. A non-transitory computer-readable data storage medium storing a computer program executable by a processor of a computing device to perform a method comprising:
exposing a plurality of application programming interface (APIs) that are callable by a client computing device different than the computing device having the processor that is to execute the computer program,
wherein the APIs comprise:
a leaf node API to create a leaf node of a plurality of nodes of a hierarchical tree, the leaf node specifying original data; and,
a non-leaf node API to create a non-leaf node of the nodes of the hierarchical tree, the non-leaf node pointed to by the leaf node, the non-leaf node specifying a script to transform the original data to generate transformed data.

10. The non-transitory computer-readable data storage medium of claim 9, wherein the APIs further comprise:
a hierarchical tree API to specify the hierarchical tree, the nodes of the hierarchical tree comprising a plurality of leaf nodes including the leaf node, and a plurality of non-leaf nodes including the non-leaf node,
wherein each leaf node points to one of the non-leaf nodes, and each leaf node specifies original data,
and wherein each non-leaf node except a top-most non-leaf node points to another of the non-leaf nodes, and each non-leaf node specifies a script to transform data input to the leaf node to generate transformed data, where each data input to the non-leaf node is one of the original data of one of the leaf nodes and the transformed data of another of the non-leaf nodes.

11. The non-transitory computer-readable data storage medium of claim 10, in which the top-most non-leaf node of the hierarchical tree is a first top-most non-leaf node that specifies a cover of a project to which the structure of the hierarchical tree corresponds, and
in which the nodes comprise a second top-most non-leaf node that specifies internal pages of the project.

12. The non-transitory computer-readable data storage medium of claim 9, wherein the APIs further comprise one or more of:
a print service API to specify a print service provider to print the transformed data;
a client API to specify an entity associated with the client computing device;
a generate API to generate the transformed data;
a print API to transmit the transformed data after generation to the print service provider; and a fulfillment API to specify a fulfillment request for the transformed data, the fulfillment request specifying a number of printed copies of the transformed data that are to he printed, and a shipping destination to which the printed copies of the transformed data are to be shipped.

13. The non-transitory computer-readable data storage medium of claim 9, wherein the method further comprises:
exposing a plurality of objects that are usable by the client computing device when calling the APIs,
wherein the objects comprise:
a leaf node object specifying a data format of the leaf node and having a method that is executable in relation to the leaf node; and,
a non-leaf node object specifying a data format of the non-leaf node and having a method that is executable in relation to the non-leaf node.

14. The non-transitory computer-readable data storage medium of claim 9, wherein the non-leaf node references the leaf node by one of:
a markup language file external to the non-leaf node that references a specification of the leaf node;
the specification of the leaf node internal to the script of the non-leaf node.

15. A computing device comprising:
a hardware network component to permit the computing device to communicate with a client computing device different than the computing device over a network;
a processor;
a computer-readable data storage medium to store a computer program executable by a processor, the computer program comprising:
a first computer program part to expose a plurality of application programming interfaces (APIs) that are callable by the client computing; device, the APIs comprising:
a leaf node API to create a leaf node of a plurality of nodes of a hierarchical tree, the leaf node specifying original data; and,
a non-leaf node API to create a non-leaf node of the nodes of the hierarchical tree, the non-leaf node pointed to by the leaf node, the non-leaf node specifying a script to transform the original data to generate transformed data; and,
a second computer program part to execute the script to transform the original data to generate the transformed data.

16. The computing device of claim 15, wherein the APIs further comprise:
a hierarchical tree API to specify the hierarchical tree, the nodes of the hierarchical tree comprising a plurality of leaf nodes including the leaf node, and a plurality of non-leaf nodes including the non-leaf node,
wherein each leaf node points to one of the non-leaf nodes, and each leaf node specifies original data,
and wherein each non-leaf node except a top-most non-leaf node points to another of the non-leaf nodes, and each non-leaf node specifies a script to transform data input to the leaf node to generate transformed data, where each data input to the non-leaf node is one of the original data of one of the leaf nodes and the transformed data of another of the non-leaf nodes.

17. The computing device of claim 16, wherein the second computer program part is further to:
navigate the hierarchical tree in a bottom-up manner; and,
for each non-leaf node of the hierarchical tree, execute the script of the non-leaf node to transform the data input to the non-leaf node to generate the transformed data.

18. The computing device of claim 16, in which the hierarchical tree API verifies that navigation of the hierarchical tree and execution of the script of each non-leaf node will be able to be completed without error.

19. The computing device of claim 15, wherein the network comprises the Internet, wherein the computing device is a server computing device accessible on the Internet via a universal resource locator (URL) address, and wherein the client computing device is to access the computing device over the network at the URL address of the server computing device.

20. The computing device of claim 15, further comprising:
a fulfillment API, the fulfillment API to specify a fulfillment request for the transformed data, the fulfillment request specifying a number of printed copies of the transformed data that are to be printed, and a shipping destination to which the printed copies of the transformed data are to be shipped.

* * * * *

UNITED STATES PATENT AND TRADEMARK OFFICE
CERTIFICATE OF CORRECTION

PATENT NO. : 8,885,192 B2
APPLICATION NO. : 13/080578
DATED : November 11, 2014
INVENTOR(S) : James Allely Rowson et al.

It is certified that error appears in the above-identified patent and that said Letters Patent is hereby corrected as shown below:

IN THE CLAIMS

In column 8, line 56, in Claim 5, delete "computing device" and insert -- method --, therefor.

In column 8, line 65, in Claim 6, delete "she" and insert -- the --, therefor.

In column 8, line 67, in Claim 6, delete "a the" and insert -- the --, therefor.

In column 8, line 67, in Claim 6, delete "a of" and insert -- a plurality of --, therefor.

In column 9, line 15, in Claim 8, delete "at" and insert -- that --, therefor.

In column 9, line 19, in Claim 9, delete "processor" and insert -- processor, --, therefor.

In column 10, line 4, in Claim 12, delete "he" and insert -- be --, therefor.

In column 10, line 36, in Claim 15, delete "computing;" and insert -- computing --, therefor.

Signed and Sealed this
Twenty-third Day of June, 2015

Michelle K. Lee
*Director of the United States Patent and Trademark Office*